United States Patent
Kuwahara et al.

(10) Patent No.: US 6,459,670 B1
(45) Date of Patent: Oct. 1, 2002

(54) OPTICAL INFORMATION RECORDING METHOD AND OPTICAL INFORMATION RECORDING DEVICE

(75) Inventors: Maho Kuwahara, Kawasaki; Hiroshi Hasegawa, Yokosuka, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/274,209

(22) Filed: Mar. 23, 1999

(30) Foreign Application Priority Data

Mar. 23, 1998 (JP) .......................... 10-073883

(51) Int. Cl.⁷ ................................ G11B 7/00
(52) U.S. Cl. ................ 369/59.12; 369/59.24; 369/47.51
(58) Field of Search .............. 369/59.11, 59.12, 369/47–51, 116, 59.24, 59.13, 59.14

(56) References Cited

U.S. PATENT DOCUMENTS

| | | | |
|---|---|---|---|
| 5,109,373 A | * | 4/1992 | Ohno et al. ................. 369/116 |
| 5,327,411 A | * | 7/1994 | Iwasa et al. ................. 369/116 |
| 5,345,435 A | * | 9/1994 | Yamasaki .................... 369/116 |
| 5,485,449 A | * | 1/1996 | Nakajo ..................... 369/59.11 |
| 5,703,865 A | | 12/1997 | Guo |
| 5,732,062 A | * | 3/1998 | Yokoi et al. ................. 369/116 |
| 5,825,742 A | * | 10/1998 | Tanaka et al. ............... 369/116 |
| 5,981,016 A | * | 11/1999 | Izumi ......................... 369/116 |
| 6,018,508 A | * | 1/2000 | Hasegawa .................. 369/116 |
| 6,104,685 A | * | 8/2000 | Saga et al. .................. 369/116 |
| 6,205,102 B1 | * | 3/2001 | Spruit ........................ 369/116 |

FOREIGN PATENT DOCUMENTS

JP 6-12674 1/1994

* cited by examiner

*Primary Examiner*—Nabil Hindi
(74) *Attorney, Agent, or Firm*—Pillsbury Winthrop LLP

(57) ABSTRACT

An optical information recording device forms a mark, in which the mark indicating record information is formed by irradiating a record light pulse on a record medium, by controlling a strength of the record light pulse according to both of a mark length of the mark and a record density in a mark length direction of the record medium.

8 Claims, 12 Drawing Sheets

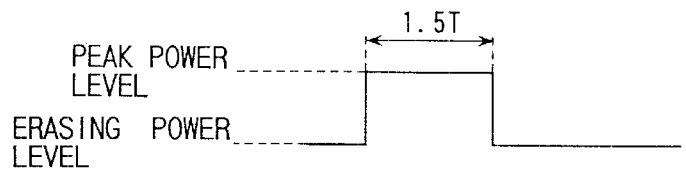
FIG. 1A (PRIOR ART)
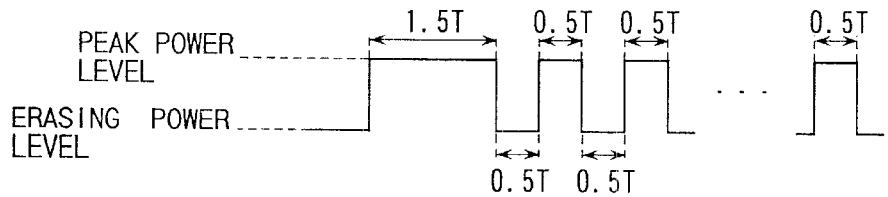
FIG. 1B (PRIOR ART)
FIG. 2A (PRIOR ART)
FIG. 2B (PRIOR ART)
FIG. 2C (PRIOR ART)

FIG. 6A
SHORT MARK (3T)
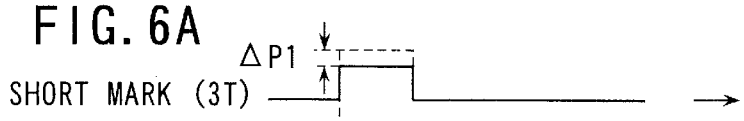
FIG. 6B
LONG MARK (5T)
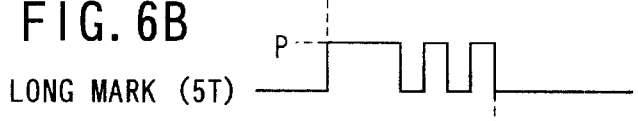
FIG. 6C
SHORT MARK (3T)
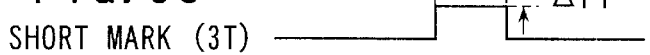
IRRADIATION LIGHT PULSE      FORMED MARK
(LINE RECORD DENSITY: LOW)
FIG. 6D
SHORT MARK (3T)
FIG. 6E
LONG MARK (5T)
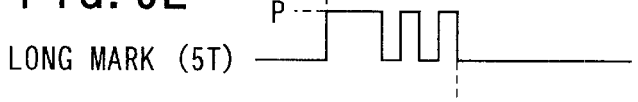
FIG. 6F
SHORT MARK (3T)
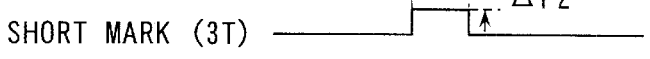
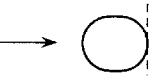
IRRADIATION LIGHT PULSE      FORMED MARK
(LINE RECORD DENSITY: HIGH)

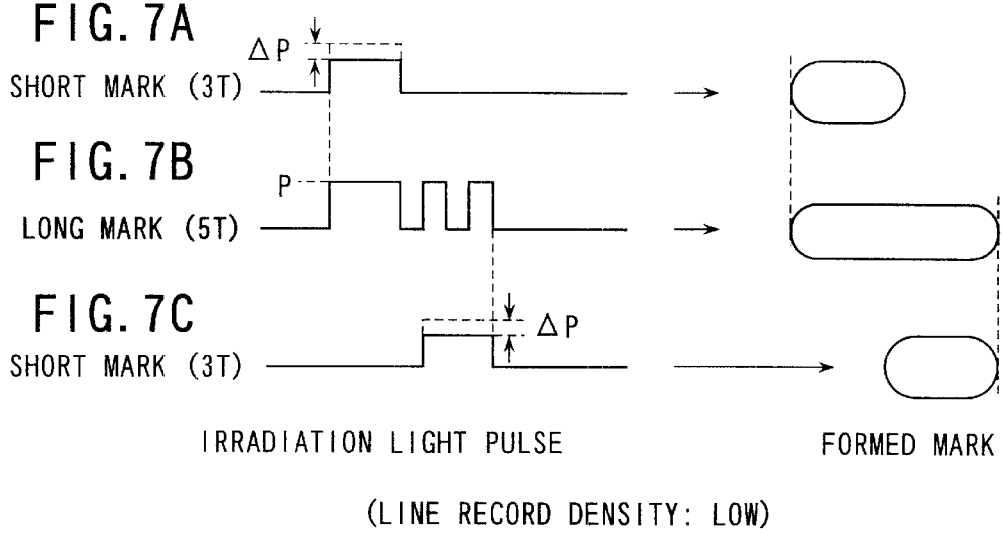
FIG. 7A SHORT MARK (3T)
FIG. 7B LONG MARK (5T)
FIG. 7C SHORT MARK (3T)
IRRADIATION LIGHT PULSE     FORMED MARK
(LINE RECORD DENSITY: LOW)
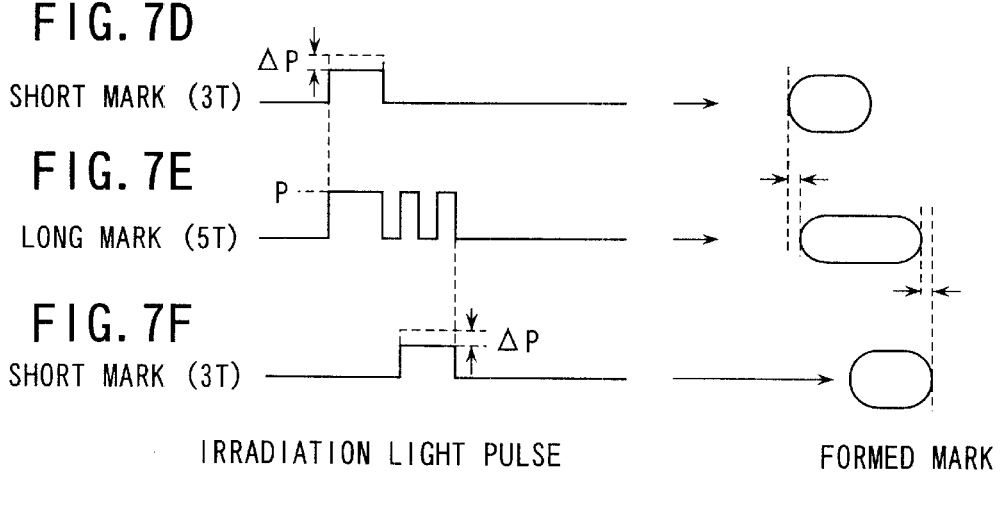
FIG. 7D SHORT MARK (3T)
FIG. 7E LONG MARK (5T)
FIG. 7F SHORT MARK (3T)
IRRADIATION LIGHT PULSE     FORMED MARK
(LINE RECORD DENSITY: HIGH)

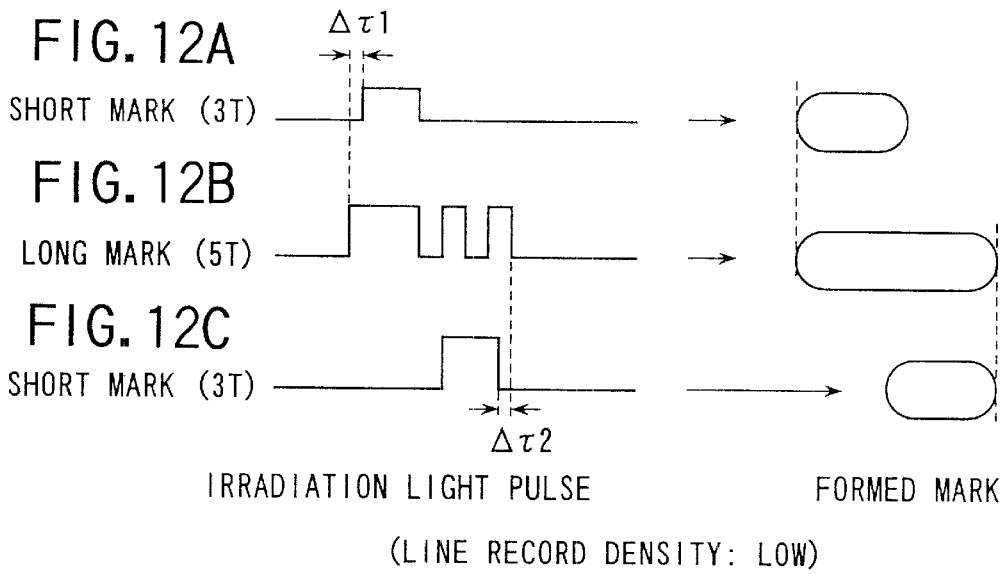
(LINE RECORD DENSITY: LOW)
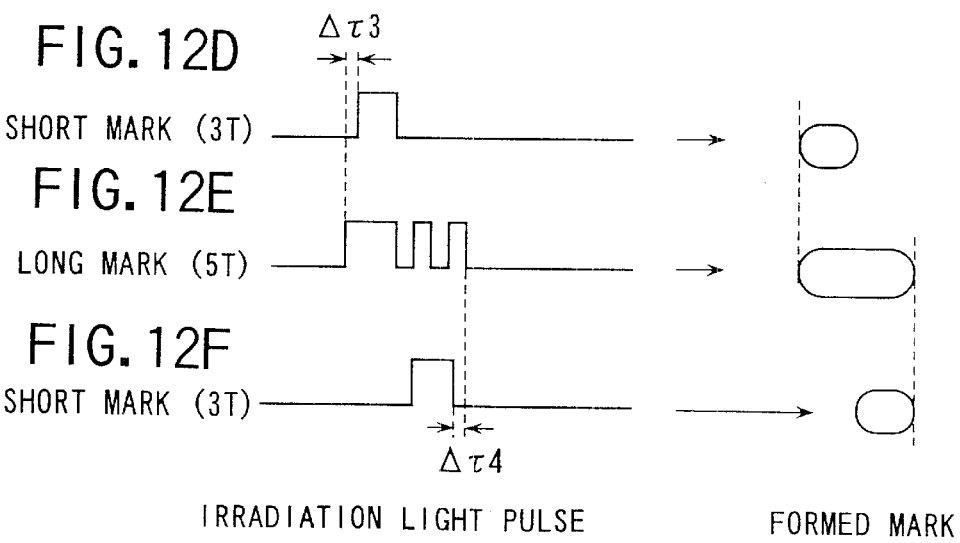
(LINE RECORD DENSITY: HIGH)

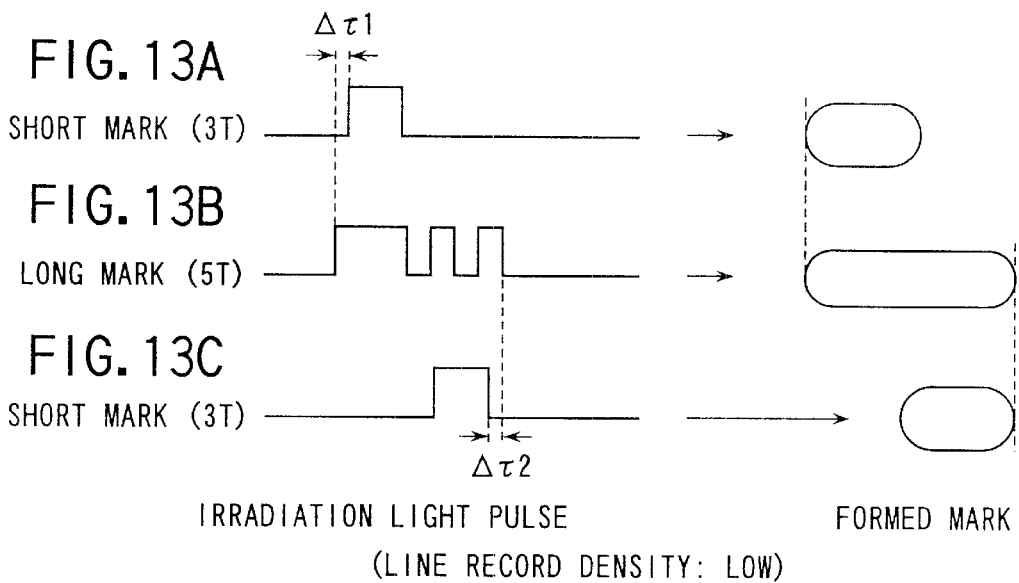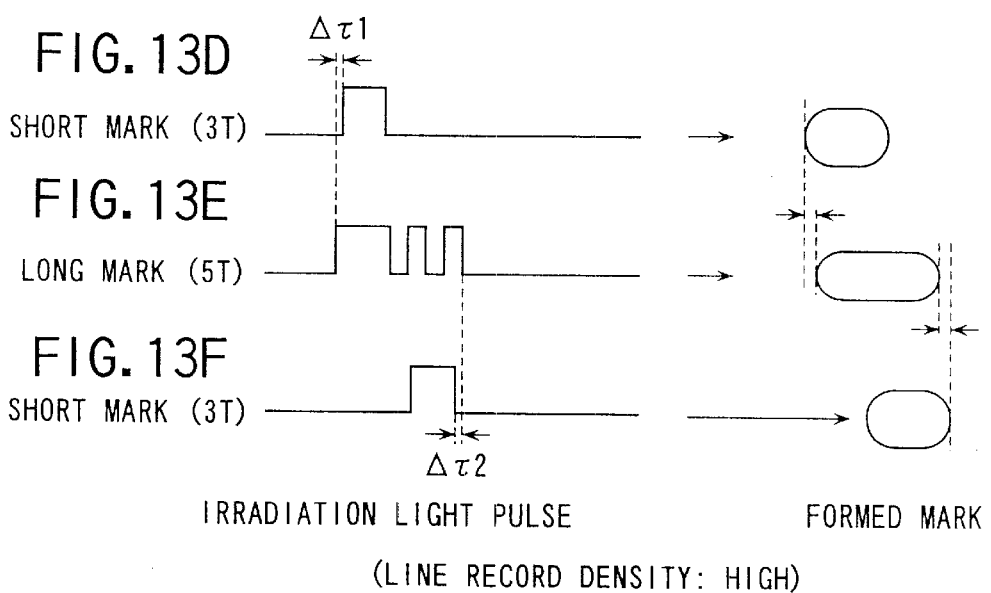

OPTICAL INFORMATION RECORDING METHOD AND OPTICAL INFORMATION RECORDING DEVICE

BACKGROUND OF THE INVENTION

The present invention relates to an optical information recording method and an optical information recording device which form mark by irradiating light on a record medium and records information.

There is a phase change type optical disk which performs recording by using a phase change between a crystal and an amorphous caused by thermal as one of an optical record medium in which light is irradiated thereon, thereby a mark capable of optically being identified is formed by thermal generated therefrom, and is recorded. The record film of the phase change type optical disk is a crystal in a steady state. However, a region where the light is irradiated gives rise to the phase change to the amorphous by being cooled after heated and melted. An information can be recorded by forming an amorphous part as a mark by using this principle. In such a phase change type optical disk, a PWM (Pulse Width Modulation) method which makes correspondence to binary information which records the position of beginning and termination of the mark is effective to improve the record density.

In general, when a long mark is formed to decrease a thermal storage effect according to the irradiation of light in a case that the PWM scheme is applied to the optical disk, a so-called multi-pulse is recorded by using a divided plurality of optical pulses not a single optical pulse as the irradiation light. An example of such a multi-pulse record is shown in FIG. 1A and FIG. 1B. FIG. 1A and FIG. 1B are examples when information is recorded by 8/16 modulation code, and the mark length becomes a discrete value of 3T to 14T for record window width T.

According to FIG. 1A and FIG. 1B, the short mark of 3T in length (hereinafter, mark of 3T in length is called "short mark" for convenience sake about the explanation) which is the shortest mark is recorded by the single pulse of 1.5T in width as shown in FIG. 1A. However, the long mark of length 4T or more (hereinafter, length 4T or more mark is called "long mark" for convenience sake about the explanation) has the period when only the amount of long or more than 3T mark repeats a peak power level period of 0.5T and an erasing power level period of 0.5T after. a leading pulse of width 1.5T shown in FIG. 1B. That is, when the long mark is recorded, the following pulse of 0.5T in width is added and formed, and the pulse width (time from start of a leading pulse to the end of the following final pulse in case of the multi-pulse) to form the mark increases T when the recorded mark length increases to T more than the shortest mark length.

However, there is a disadvantage in which the position of the beginning and the termination of the mark actually formed changes from the planned position depending on the length of the mark length even if such a multi-pulse is recorded. The beginning position and the termination position shift in a direction where the long mark is shortened compared with the short mark as for the formed mark, even when the irradiation starting or the irradiation completion of a light pulse is performed according to the same timing as shown from FIG. 2A in FIG. 2C for example according to only the mark length and the length at mark intervals.

That is, when the irradiation of light is started on the same timing when the short mark and the long mark are formed, both of them become the same heating condition until the leading pulse irradiation is completed. When a short mark which uses only a leading pulse is formed, the region where the medium is heated and melted is cooled as it is and becomes an amorphous. The beginning position of the mark shifts in the direction where the mark length is shortened, since the region which is heated and melted by a leading pulse receives re-heating by the irradiation of the following pulse, and the re-crystallization in the peripheral section of an amorphous region is accelerated when the long mark which uses the multi-pulse record is formed.

On the other hand, when an optical irradiation is completed when the short mark and the long mark are formed at the same timing, both of the temperature distributions when an optical irradiation is completed by a thermal characteristic of the medium are not always the same. The reason is as follows. The medium temperature immediately after heating by the following pulse lowers more than the medium temperature immediately after heating by a leading pulse when the long mark is formed. Therefore, a melted region of the optical irradiation end becomes small. As a result, the termination position of the mask shifts in the direction where the mark length is shortened as for the long mark.

The beginning position and the termination position of the long mark shift in the direction where the mark length is shortened more than the beginning position and the termination position of the short mark like this. It becomes necessary to perform some record compensation to avoid the shift of the beginning position and the termination position of the mark according to the mark length, and to accurately form the mark. As this record compensation method, a method of forming the mark by moving the leading pulse and the final pulse positions of the irradiation light pulse beforehand according to the length of the mark which intends to be formed is proposed.

However, it is necessary to change and generate an optical pulse from the clock synchronization state in this record compensation method, and it is necessary to change the amount of the change (that is, amount of the move at the position of the leading and the end by the length of the mark) according to the mark length. The disadvantage in which coexisting of accuracy and the cost becomes difficult occurs, since a complex circuit like the programmable delay line is needed.

As mentioned above, in the conventional record compensation method by which the position of the leading and the end of the irradiation light pulse is moved and generated beforehand according to. the length of the mark and the mark is formed to avoid the shift of the beginning position and the termination position of the mark according to the length of the mark and to form the mark in accuracy, there is a disadvantage that a complex circuit is necessary to change the amount of the change and it is difficult to make the accuracy of the formed mark and the cost united, by the change of an optical pulse from the clock synchronization state and the occurrence according to the mark length,.

BRIEF SUMMARY OF THE INVENTION

Therefore, an object of the present invention is to provide an optical information recording method and the optical information recording device which have the record compensation method by which the accuracy of the mark formed without accompanied by a big cost increase is enabled to be improved.

Another object of the present invention is to provide an optical information recording method and an optical information recording device which have the compensation method for the record which can improve the position accuracy of the mark formed even when the line record density is different.

An optical information recording device according to the present invention forms a mark, in which the mark indicating record information is formed by irradiating a record light pulse on a record medium, by controlling a strength of the record light pulse according to both of a mark length of the mark and a record density in a mark length direction of the record medium.

Another optical information recording device according to the present invention forms a mark, in which the mark indicating record information is formed by irradiating a record light pulse on a record medium, by controlling a pulse width of the record light pulse according to both of a mark length of the mark and a record density in a mark length direction of the record medium.

Still another optical information recording device according to the present invention forms a mark, in which the mark indicating record information is formed by irradiating a record light pulse on a record medium, by controlling a strength of the light and a pulse width of the record light pulse according to both of a mark length of the mark and a record density in a mark length direction of the record medium.

Preferred manners of the present invention are as follows.

(1) The record light pulse includes at least one of a monopulse which has a width corresponding to the mark length, and a multi-pulse which has a plurality of pulses according to a number of pulses corresponding to the mark length. Where, a strength of the record light pulse after irradiation of the monopulse or the multi-pulse is lower than a strength necessary to erase the mark. The multi-pulse includes a plurality of pulses and a strength of the multi-pulse between each of the plurality of pulses is lower than a strength necessary to erase the mark.

(2) The record light pulse has a first light pulse, which is a monopulse corresponding to the first mark length, to form a first mark having a first mark length shorter than a predetermined length, and a second light pulse, which is a multi-pulse which consists of a plurality of pulses according to a number of pulses corresponding to the second mark length, to form a second mark having a second mark length longer than the first mark length of the first mark.

(3) The record light pulse has a first record light pulse to form a first mark having a first mark length shorter than a predetermined length and second record light pulses to form a second mark having a second mark length longer than the first mark length, and a strength of the first record light pulse is lower than a strength of a part of the second record light pulses.

(4) A strength of the record light pulse to form a mark having a predetermined mark length is lowered with increasing a record density in the mark length direction.

(5) A pulse width of the record light pulse to form a mark having a predetermined mark length is shortened with increasing a record density in the mark length direction.

(6) The record light pulse has a plurality of record light pulses and the plurality of record light pulses differ from each other.

(7) Especially, it is suitable for an optical information recording method to which the record film is changed from the crystal to the amorphous by thermal, and the mark is formed with the irradiation light by using the medium which has the record film of the phase change type as a record medium.

As for the optical information recording method according to the present invention, in that case, it is possible to achieve of course as a device to execute the method, and the optical information recording device has the means (element) to execute the method. It is desirable that an optical information recording device has a register storing an irradiated light strength information and a pulse width information, and at least one of the optical strength and the pulse width by replacing this optical strength information temporarily stored to the memory means and the pulse width according to the record density in the mark length direction of the record medium.

According to the present invention, The shift of the beginning position and the termination position of the mark is reduced depending on the mark length which is intended to be basically formed, (a) by lowering a strength of the irradiation light (for example, single pulse) when the short mark is formed than a strength of the irradiation light (for example, multi-pulse) when the long mark is formed, (b) by comparing pulse widths of the irradiation light when the short mark is formed with the pulse width of the irradiation light when the long mark is formed and shortening it more than the difference of the mark length of the short mark and the long mark, or (c) by changing both strength and the pulse width of these irradiation light depending on the mark length.

In this case, like the conventional record compensation method by which the position of the leading and the end of the irradiation light pulse are moved beforehand according to the length of the mark which intends to be formed and the mark is formed, a complex circuit like the programmable delay line is never needed to change the amount of the change and by the change of an optical pulse from the clock synchronization and the occurrence according to the mark length, compensation of the record as mentioned above can be achieved by using the strength switch function that the power controller of the optical disk drive has it essential, and performing an easy pulse width expansion and contraction operation. Therefore, high information record reliability can be obtained by improving the accuracy of the mark formed without greatly increasing a cost.

Even when the line record density, i.e., the record density in the mark length direction is different, the shift of the beginning position and the termination position of the mark is decreased depending on the mark length which intends to be formed further in the present invention, (a') a degree of lowering the strength is changed according to the record density in the mark length direction when the strength of the irradiation light when the short mark is formed like (a) is lower than strength of the irradiation light (for example multi-pulse) when the long mark is formed, or (b') a degree by which the pulse width is shortened according to the record density in the mark length direction is changed, when pulse widths of the irradiation light when the short mark is formed like (b) are compared with the pulse width of the irradiation light when the long mark is formed and it shortens it more than the difference of the mark length of the short mark and the long mark, or (c') by changing the degree of both strength and the pulse width of the irradiation light changes depending on the record density in the mark length direction when both strength and the pulse width of the irradiation light depend on the mark length like (c) to change it.

As described above, in the present invention, depending on the mark length which intends to be formed, for example, (a) strength of the irradiation light (for example single pulse) when the short mark is formed is lower than strength of the irradiation light (for example multi-pulse) when the long mark is formed, and the lowered degree is changed according to the record density in the mark length direction, (b) when pulse width of the irradiation light when the short mark is formed are compared with the pulse width of the irradiation light when the long mark is formed, it is shortened more than the difference of the mark length of the short mark and the long mark, and the shortened degree is changed according to the record density in the mark length direction, or (c) both strength of the irradiation light and the pulse width are changed according to the mark length, and the degree of the change depends on the record density in the mark length direction.

Therefore, according to the present invention, the shift of the edge position according to the length of the mark can be avoided, the amount of the shift at the beginning position of the mark can decrease even when the line record density, that is, the record density in the mark length direction is different, and can do the record compensation in which coexisting of accuracy and low-cost are enabled without complicating the hardware configuration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A and FIG. 1B are the explanation charts of the irradiation light pulse based on the prior art;

FIG. 2A to FIG. 2C are figures which show the change in the edge position of the mark by the length of the mark length to explain the problem of the prior art;

FIG. 6A to FIG. 6F are figures which show the formed mark on the optical disk and the irradiation light pulse when the line record density is low and high in the embodiment;

FIG. 7A to FIG. 7F are figures which show the change in the mark beginning and termination position when the line record density is low and high in the record compensation only by strength of the irradiation light;

FIG. 12A to FIG. 12F are figures which show a formed mark on the optical disk and the irradiation light pulse when the line record density is low and high in the embodiment and high is shown; and FIG. 13A to FIG. 13F are figures which show the change in the mark beginning and termination position when the line record density is low and high in the record compensation only by a pulse width of the irradiation light.

DETAILED DESCRIPTION OF THE INVENTION

Figure 3:
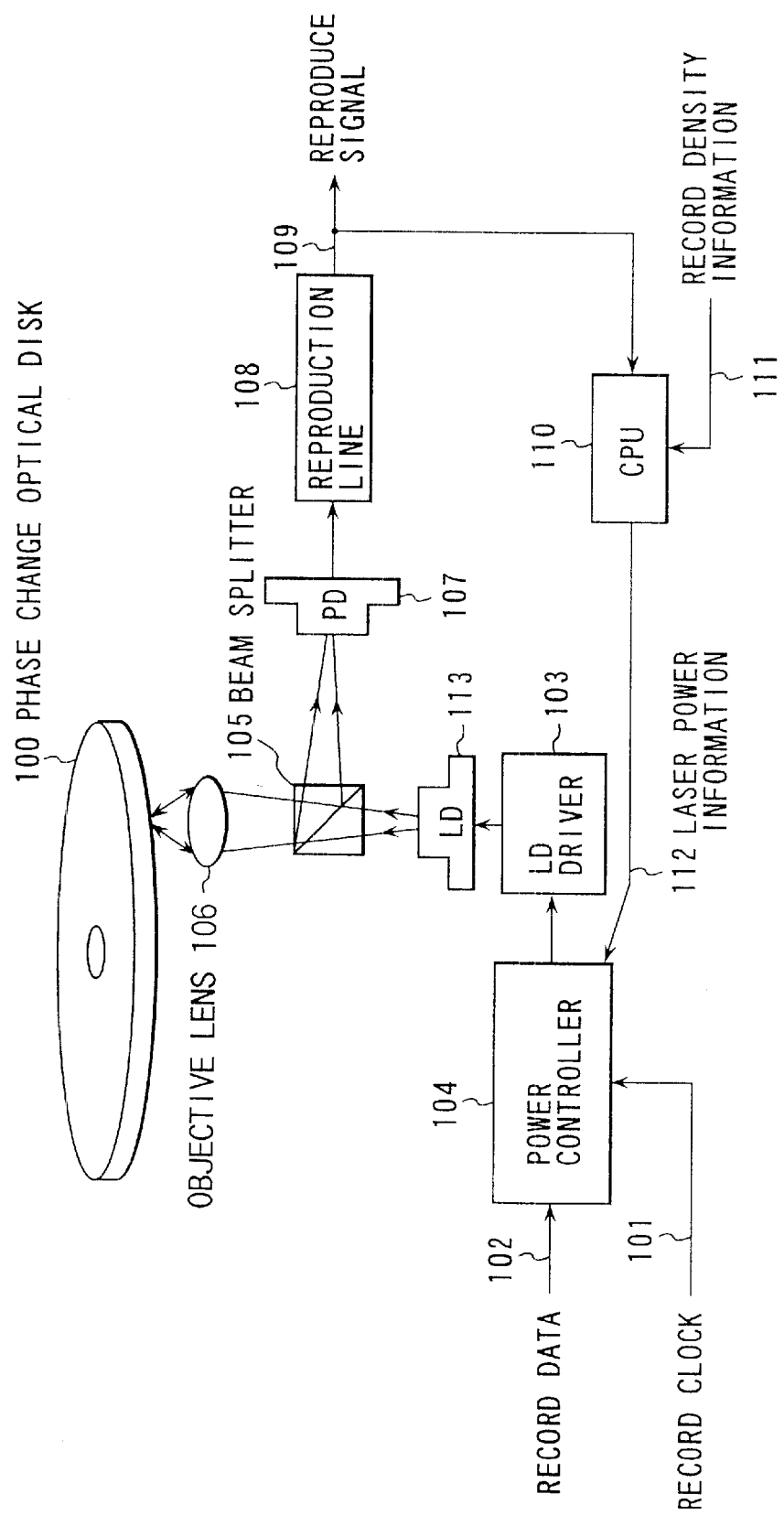
FIG. 3 is a configuration chart of the optical disk drive according to the first embodiment of the present invention.

Hereafter, an embodiment of the present invention referring to the drawing will be explained.
(First Embodiment)

FIG. 3 shows a configuration of an optical disk drive according to the first embodiment of .the present invention. In the first embodiment, an example of applying record compensation method of controlling as strength of record light is changed according to length of mark length, and degree of change is changed according to record density in direction of mark length to optical disk drive will be explained.

When recording data 102 are recorded on a phase change optical disk 100, a record clock 101 and a record data 102 which synchronize with this are input by a power controller 104. The power controller 104 generates the record waveform corresponding to the record data 102 and a laser power information 112. An LD driver 103 drives a laser diode (LD) 113 according to this record waveform and irradiates the laser light. Here, the laser power information 112 is decided by CPU 110 based on record density information 111 in the mark length direction. The laser light irradiated from the laser diode 113 is incident to the objective lens 106 through the beam splitter 105, and is irradiated on the phase change optical disk 100 as a minute spot by the objective lens 106.

Since the part irradiated by the peak power level of the laser light becomes an amorphous on the phase change optical disk 100, an amorphous mark according to record data 102 is formed on a corresponding part. The position of the beginning and the termination of this mark correspond to binary information on the record data 102.

On the other hand, when data is reproduced from the phase change optical disk 100, the reflection light from the phase change optical disk 100 is incident to a photodetector 107 through a beam splitter 105. The reproduce signal 109 is obtained by detecting the reflectivity difference between a crystal state and an amorphous state on phase change optical disk 100 with this photodetector 107, and signal-processing the output signal of photodetector 107 which corresponds to this reflectivity difference in reproduction system 108.

Next, the power controller 104 which is a feature of the embodiment will be explained by using FIG. 4 and FIG. 5.

Figure 4:
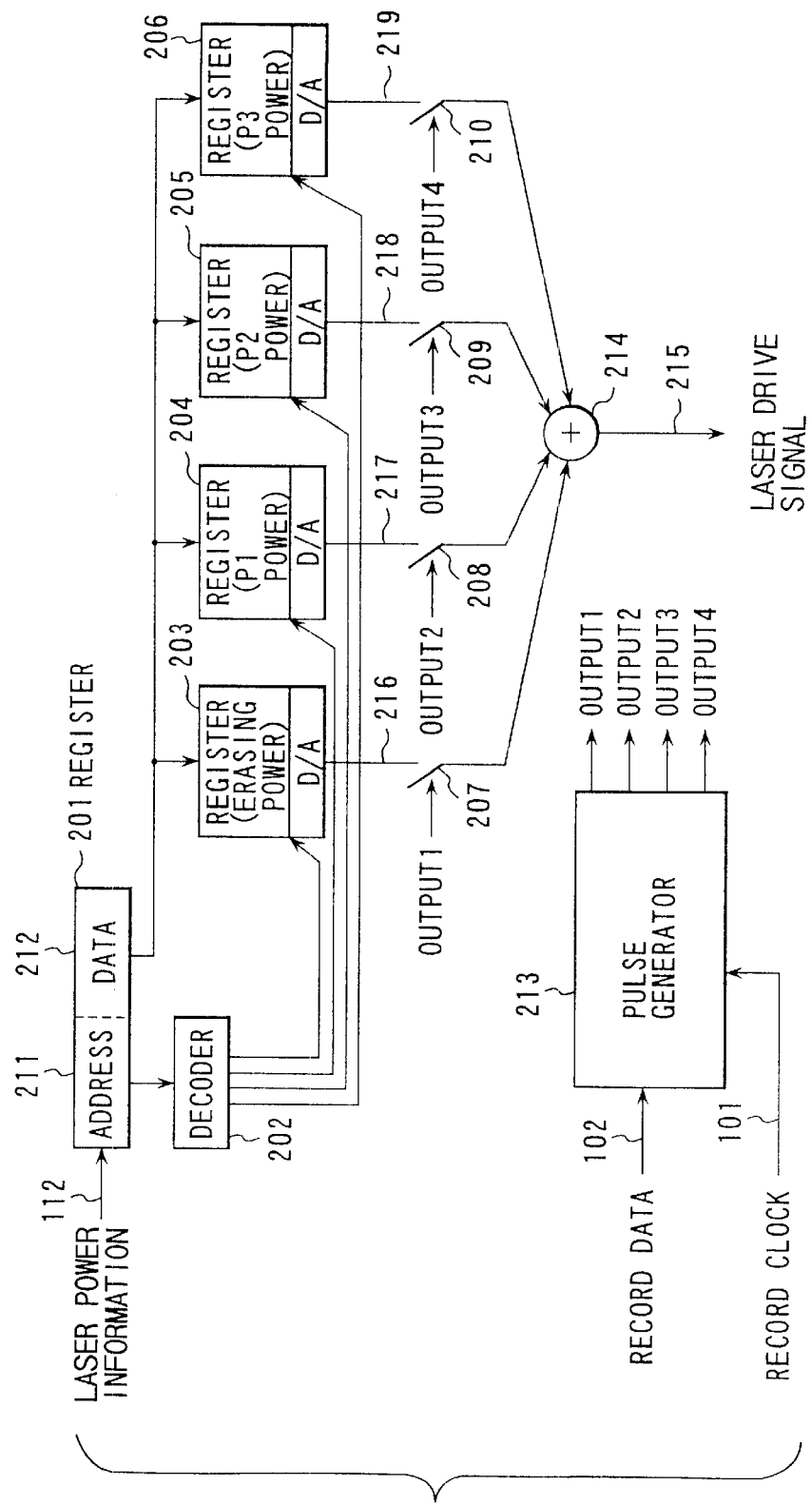
FIG. 4 is a configuration chart of a power controller according to the embodiment.
Figure 5:
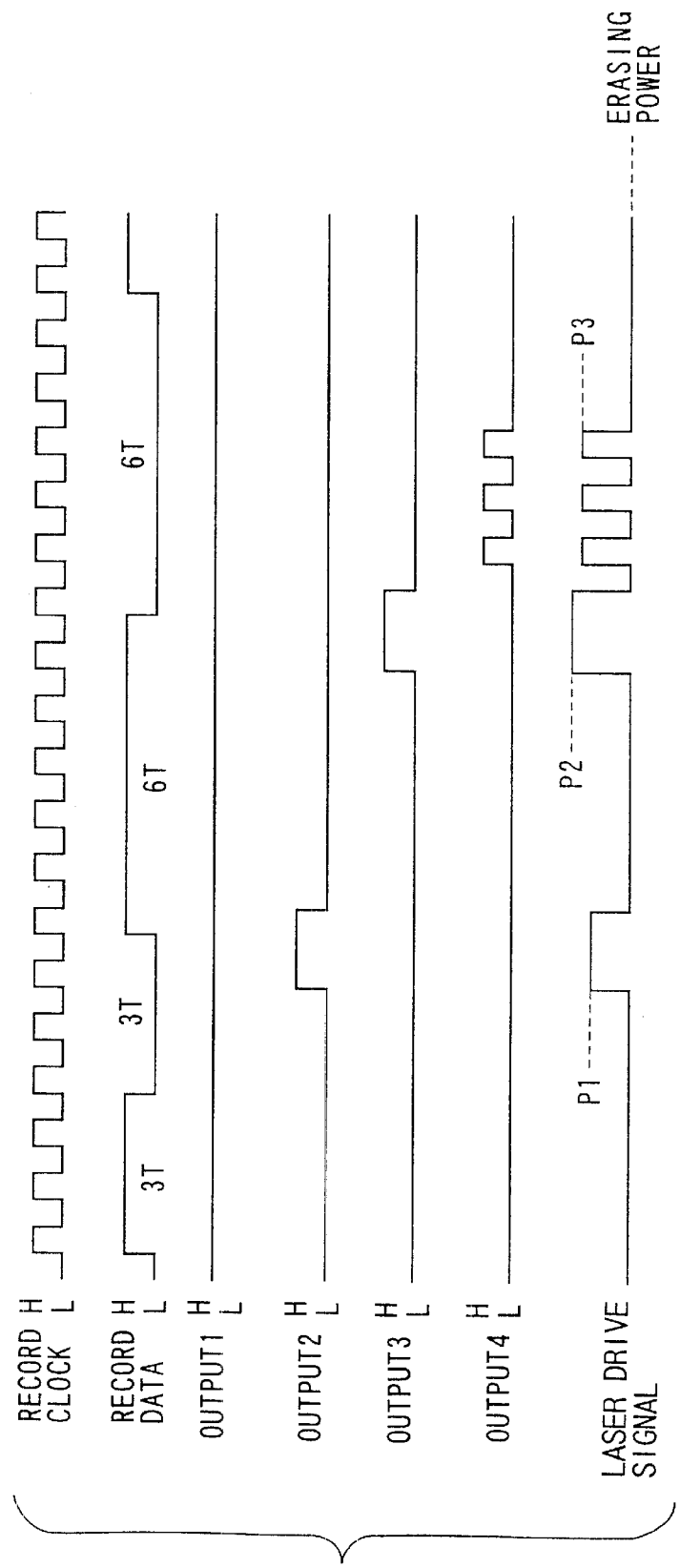
FIG. 5 is a waveform chart to explain an operation of the power controller.

The configuration example of the power controller 104 is shown in FIG. 4, and the operation waveform thereof is shown in FIG. 5. The record data 102 is ⅜16 modulation code, and, for instance, is input to the pulse generator 213 synchronizing with the record clock 101. The pulse generator 213 has outputs 1 to 4 in the embodiment. The output 1 is held in "H" whenever recording. The pulse of 1.5T in width is output to the output 2 when the mark which should be formed is 3T of the shortest mark in length. The pulse of 1.5T in width is output to output 3 at length 4T or more mark. Whenever the period of 1T extends more than 3T, the pulse of 0.5T in width to outputs 4 one by one when length 4T or more mark is formed is output. In this example, outputs 1 to 4 of pulse generator 213 is late and output for five clocks compared with the input of record data 102.

These outputs 1 to 4 are supplied to switches 207 to 210 as a control signal, respectively, and turn on the corresponding switches at "H".

The laser power information 112 has power information corresponding to the record density (line record density) in the direction of the record of the mark length, and is stored in register 201 once. Register 201 stores address 211 and data 212. One of registers 203 to 206 is selected with decoder 202 according to address 211 (information which shows any of registers 203 to 206), and actual data 212 (laser power information) is stored in the selected register.

As a result, strength of the irradiation laser light (the erasing power level, and peak power levels of P1, P2, and P3) is set in registers 203 to 206, and it is converted into current or voltage signals 216 to 219 with the D/A converter in each output steps of registers 203 to 206. Laser drive signal 215 shown in FIG. 05 is obtained that this current or voltage signals 216 to 219 are selected with switches 207 to 210 which are turned on and off according to the signals of outputs 1 to 4 and the current addition or voltage addition is performed by adder 214. This laser drive signal 215 is supplied to from the power controller 104 to LD driver 103 in FIG. 3.

With such a configuration, the peak power level (strength of the irradiation light) when the mark is recorded is basically changed according to the mark length. Specifically, as shown in FIG. 6A to FIG. 6C for example, when the short mark of 3T in length is recorded, it is assumed peak power level (P−ΔP1) by which only ΔP1 is subtracted from peak power level P when the long mark of length 4T or more is recorded. As a result, the shift of the beginning position and the termination position of the formed mark can be compensated.

A basic effect of the embodiment can be explained as follows.

First, if the irradiation of light is started on the same timing when the long mark of short mark of FIG. 2A (mark length 3T) and FIG. 2B (mark length 5T) is recorded respectively, a leading optical pulse irradiation end of 1.5T in width becomes the same heating condition as both in the conventional technology. The region on optical disk 100 which is heated and melted is cooled as it is, becomes an amorphous since FIG. 2A is only a leading pulse, and the mark is formed. Since some re-heatings are caused in FIG. 02B for this during the cooling-off period in the region which is heated and melted by a leading pulse by the irradiation of the following pulses, a recrystallization is promoted for FIG. 02A in the part around an amorphous region. As a result, the beginning position of the mark shifts in the direction where the mark length is shortened.

On the other hand, when the short mark of FIG. 2C (mark length 3T) and the long mark of FIG. 2B (mark length 5T) is recorded, even if the irradiation of light is terminated at the same timing, both of them are not necessarily the same temperature distribution when an light irradiation terminates. Though this depends on a thermal characteristic of the record medium, the medium temperature immediately after heating by the following pulse of 0.5T in width of FIG. 2B lowers more than the medium temperature immediately after heating by a leading pulse of 1.5T in width of FIG. 2C if it is a medium to which the heating region is comparatively cooled quickly. Therefore, since melted region of the optical irradiation end for FIG. 2C becomes small, the termination position will shift the amorphous mark formed after it cools in the direction where the mark length is shortened as for FIG. 2B.

That is, the irradiation starting light or the irradiation end is performed when the short mark is formed according to timing that both of them are the same as the beginning position and the termination position of the mark and it shifts in the direction where the mark length extends from the beginning position of the formed long mark and the termination position. The record compensation method by which the peak power level (strength of the irradiation laser light) is basically changed according to the length of the mark length is adopted in the embodiment for the compensation for the shift of the beginning position of the mark according to the length of such mark length and the termination position.

In addition, even if optical disk 100 is the same medium in the embodiment, the peak power level is made to differ according to the record density (line record density) in the mark length direction as shown from FIG. 6A in FIG. 6F. That is, peak power level (P−ΔP1) by which only ΔP1 is subtracted from peak power level P when long mark of length 4T or more is recorded only at time when short mark of 3T in length is recorded as shown from FIG. 6A in FIG. 6C as mentioned above when line record density is low.

On the other hand, when the line record density is high, the beginning position and the termination position of a more highly accurate mark can be formed by assuming peak power level (P−ΔP2) by which only ΔP2 (≠ΔP1) is subtracted from peak power level P when the long mark of length 4T or more is recorded only at time when the short mark of 3T in length is recorded as shown from FIG. 6D in FIG. 6F. In general, when a compensation of the pulse width described later is not performed, it is preferable to perform the compensation in which the higher the line record density is, the smaller the peak power level is (making compensation ΔP large). An optical strength may differ between each pulse as shown in FIG. 5, though an optical strength of all the multi-pulses which include a leading pulse is constant in this embodiment when recording the long mark.

For example, only ΔP is changed in the peak power level when the short mark is recorded as shown from FIG. 7A in FIG. 7F, and the beginning or termination position of the short mark can be set to the beginning or termination position of the long mark.

When the record density in the mark length direction is different, the same medium has the possibility not being kept for position of the shift of the above-mentioned mark beginning and the termination highly accurate according to this record compensation method. That is, a highly accurate mark can be formed even by the record compensation method which is peak power level (P−ΔP) by only ΔP is subtracted from peak power level P, when the long mark of length 4T or more is recorded only at time when the short mark of 3T in length is recorded as shown in FIG. 7A, FIG. 7B, and FIG. 7C when the record density in the mark length direction is low. However, when a line record density is high, the beginning position and a termination position of the mark shift even if the peak power level is (P−ΔP) when a short mark of 3T in length is recorded.

That is, a case which the mark position cannot be performed with high accuracy in the conventional same record compensation when both a high density record and the low density record are achieved for the same record medium with the device which can reproduce a high density record.

Moreover, when more than two kinds of record media with a different record density in the mark length direction and an optical information recording devices exist together, and the interchangeability of these record reproduction is secured, there is a case of which a highly accurate formation of the mark position cannot be performed.

For example, the state that the record reproducing device (high density record reproducing device) for a medium with a high record density in the mark length direction (high density medium) and this high density medium is developed in the future is considered. In the record compensation when information is recorded with a high density by the high density record reproducing device, when a low density record is performed in an existing low density medium with this high density record reproducing device, the beginning position and the termination position of the mark recorded may shift from the predetermined position contrary to the above-mentioned.

In addition, when information with a low density record is performed on a high density medium with an existing record reproducing device (low density record reproducing device), the beginning position and the termination position of the mark similarly recorded may shift from the predetermined position.

That is, interchangeability in the media between generations can be given according to the present invention since it does not depend on the record density.

Figure 8A:
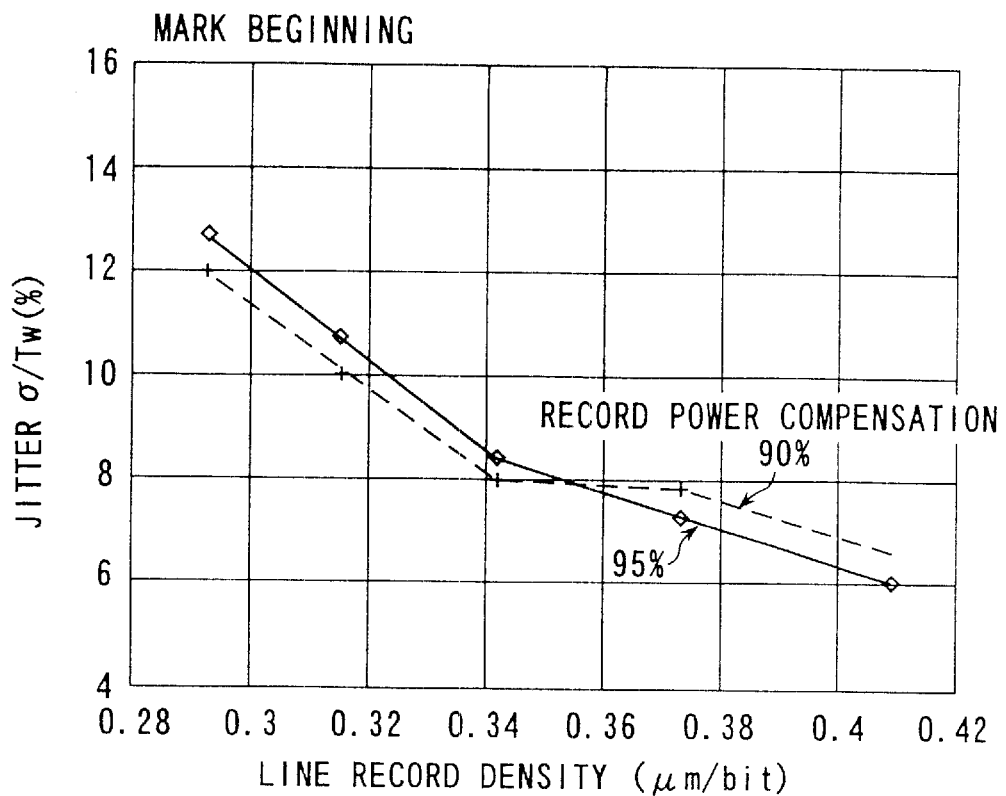
FIG. 8A and FIG. 8B are figures which show the experiment result that the optical record compensation is different according to the difference of the line record density in the embodiment.
Figure 8B:
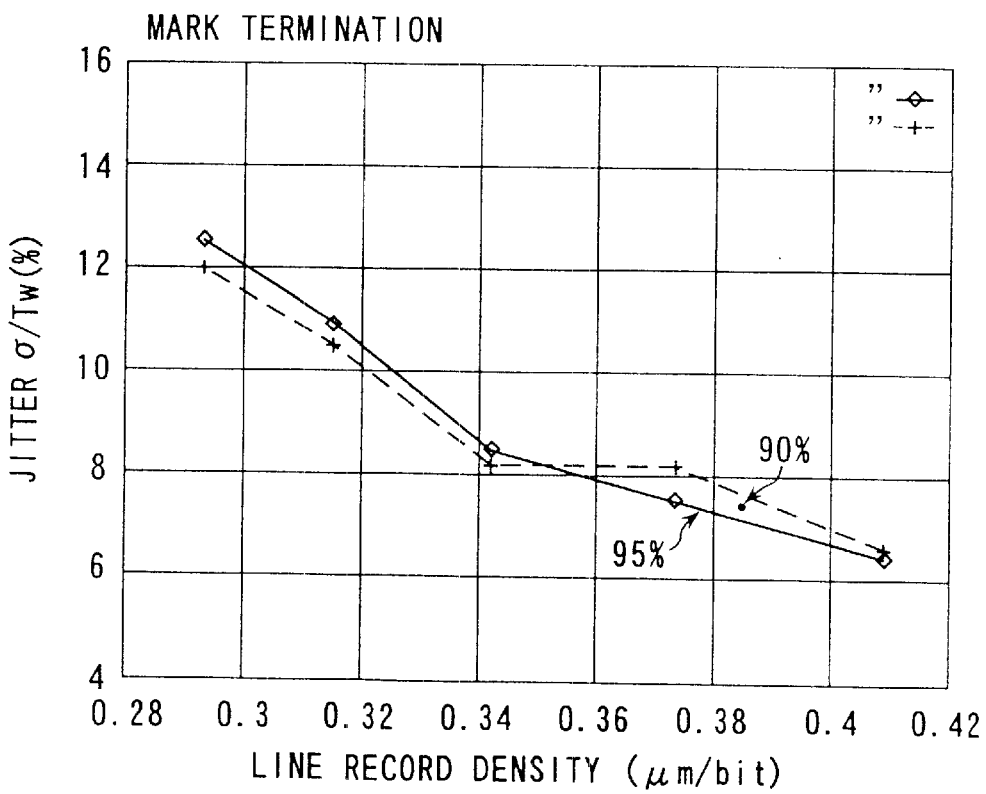

FIG. 8A and FIG. 8B show the result of the experiment which inventors performed to confirm the effect of the record compensation based on this embodiment. This is a measurement result of the amount of the jitter between mark beginnings and between terminations when random data of 8/16 modulation code is recorded on the phase change optical disk 100 by the PWM scheme with the line record density (channel bit length) in 0.41 μm/bit to 0.315 μm/bit. Here, the jitter indicates the dispersion from a real position of the beginning position of the mark or the termination position, and means that the smaller this is, the higher the information record reliability is.

Each graph of FIG. 08A and FIG. 08B shows the amount of the jitter of the mark beginning and the termination in a case of using the record compensation to 95% and 90% of the peak power level are used as the peak power level when the length mark of length 4T or more is recorded, in a case that the shortest mark of 3T in length is recorded. It is understood that the jitter using the compensation of the record of 95% is small in the region in 0.41 μm/bit to 0.35 μm/bit where the line record density is comparatively low, and the jitter using compensation of the record of 90% is small in the region in 0.35 μm/bit to 0.285 μm/bit where the line record density is comparatively high in both cases.

As mentioned above, without depending on the line record density, the effectiveness of the present invention in which high information reliability is obtained can be confirmed by changing the peak power level compensation according to the line record density.

Such processing can be easily achieved by deciding laser power information 112 input in power controller 104 according to record density information 111 as shown in FIG. 3, and storing it in registers 203 to 206 through register 201 shown in FIG. 4.

In addition, plural kinds of the peak power levels are switched in the record compensation by the embodiment according to the record condition, i.e., the mark length and the line record density. When the record compensation according to the embodiment is performed since such a power switch function is a function essential inherent in power controller 104 of the optical disk drive, a big cost increase is not accompanied.

On the other hand, not only addition of the record condition judgment circuit, and also a complex circuit such as programmable delay lines to move the position of the pulse are necessary, in the prior art, because of the record compensation method which moves the position of a leading pulse in the multi-pulse and the end pulse beforehand according to the length of the recorded mark length and records. In the embodiment, such a complex and expensive hardware is unnecessary, and coexisting of high accuracy and low-cost is easy.

(Second Embodiment)

Figure 9:
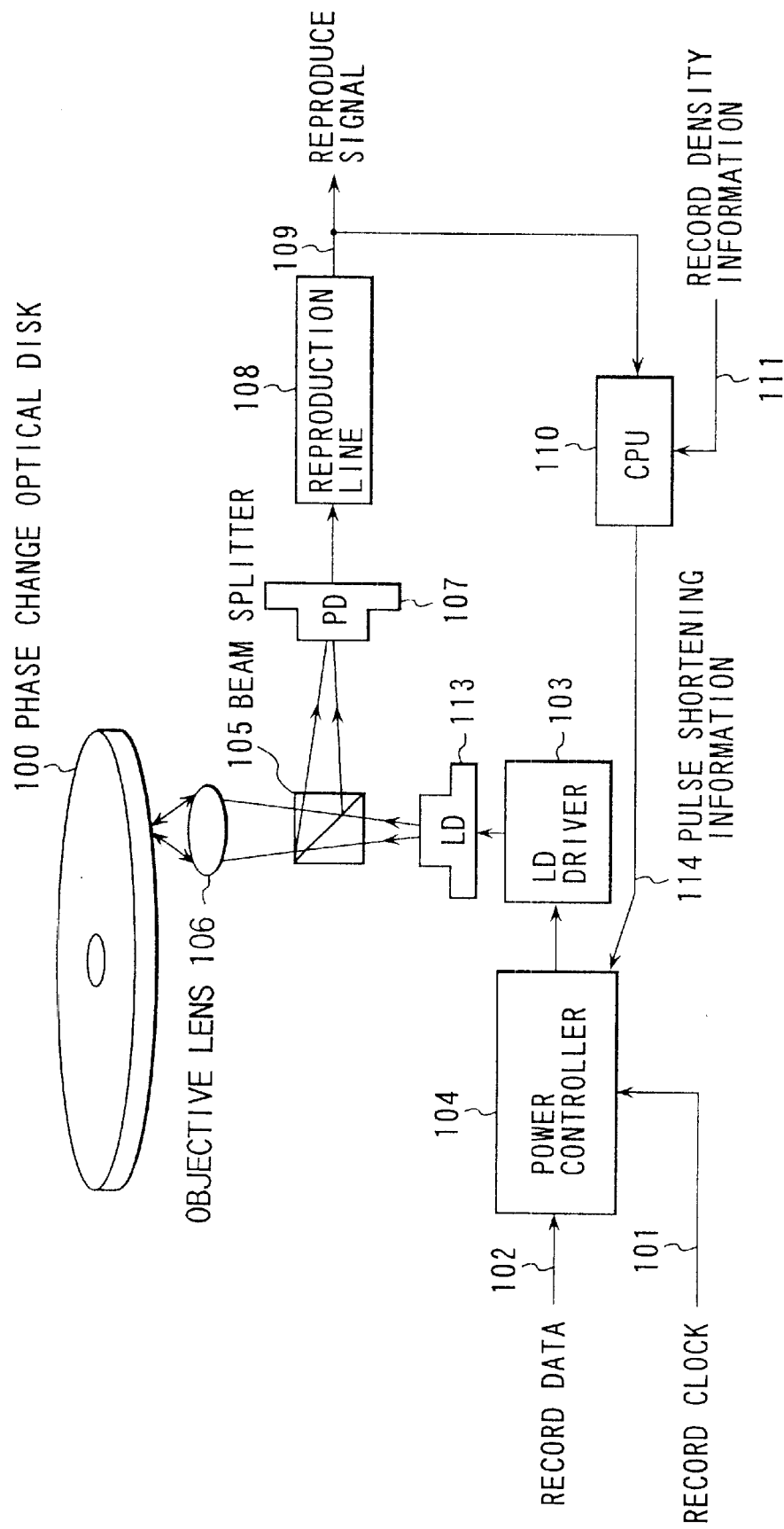
FIG. 9 is a configuration chart of the optical disk drive according to the second embodiment of the present invention.

FIG. 9 shows a configuration of the optical disk drive according to the second embodiment of the present invention. An example of applying record compensation method which changes a pulse width of the record light according to length of mark length, and changes a pulse width more than length of mark length according to line record density (for example, channel bit length) will be explained in the embodiment.

The record compensation method of changing the pulse width which is basic of the embodiment is a method of positioning the beginning position and the termination position of the mark in high accuracy by shortening the pulse width only to $\Delta\tau 1$ and $\Delta\tau 2$ respectively at start and the termination of the pulse as shown from FIG. 7A in FIG. 7F instead of changing the peak power level for only $\Delta P$ as shown from FIG. 7A in FIG. 7F.

The same reference numeral is attached to the same part of FIG. 3 and will be explained. The embodiment differs from the first embodiment in the point that laser power information 112 supplied to power controller 104 by CPU 110 in FIG. 3 is replaced to pulse shortening information 114.

Figure 10:
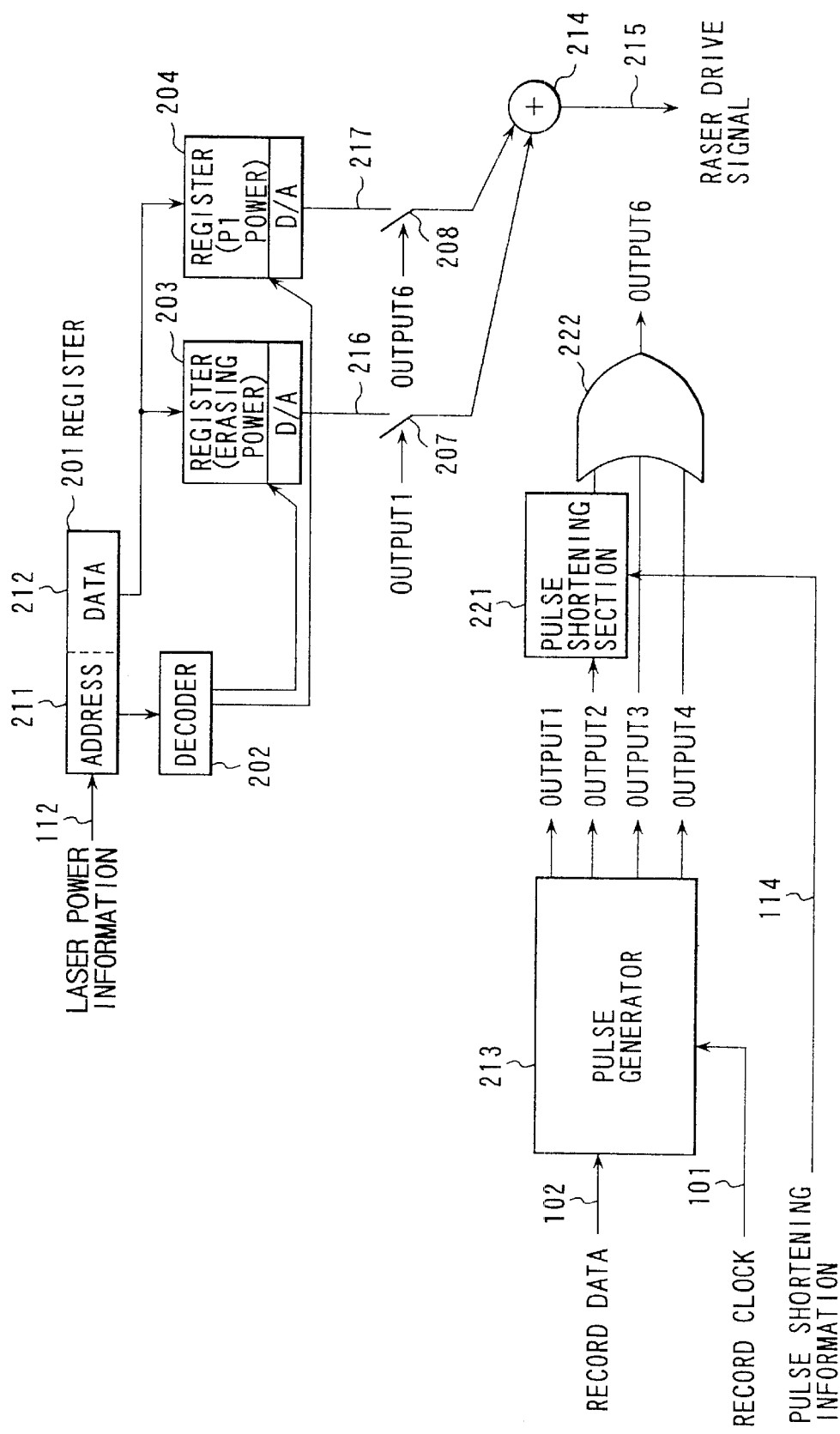
FIG. 10 is a configuration chart of a power controller in the embodiment.
Figure 11:
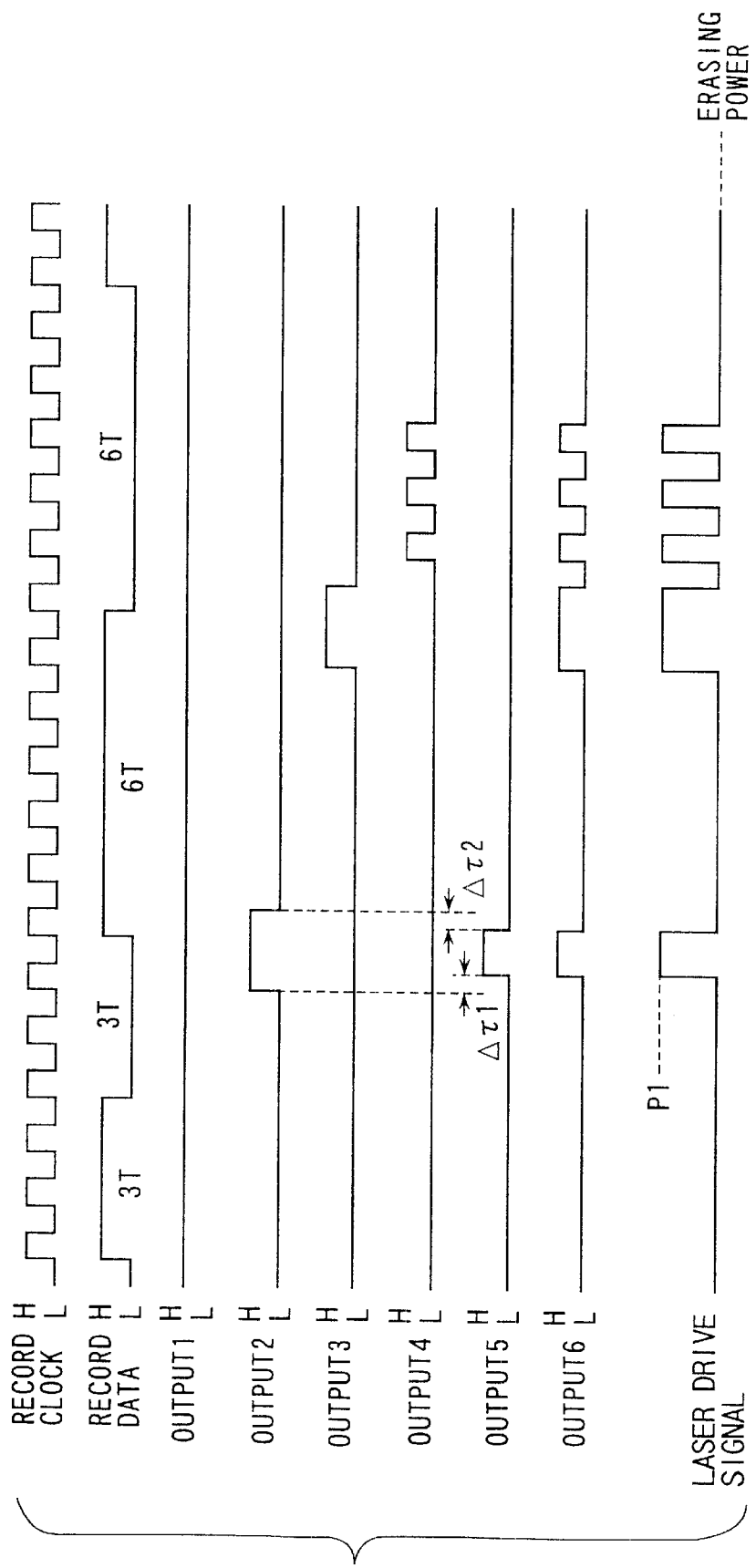
FIG. 11 is a waveform chart to explain an operation of this power controller.

Next, the power controller 104 will be explained referring to FIG. 10 and FIG. 11. FIG. 10 is a configuration example of the power controller 104 according to the embodiment, and FIG. 11 is an operation waveform thereof.

The record data 102 is, for example, 8/16 modulation code as same as mentioned above, and is input to the pulse generator 213 synchronizing with record clock 101. On the other hand, the pulse shortening information 114 is output from CPU 110 according to the record density (line record density) in the mark length direction, and input to the pulse width shortening section 221 of FIG. 10.

The pulse generator 213 outputs the pulse of 1.5T in width to the output 2 only at the shortest mark of 3T in the mark length, and the pulse of 1.5T in width is output to the output 3 in the long mark of length 4T or more. Whenever period 1T extends more than 3T, the pulse of 0.5T in width is output to the output 4 one by one at the long mark of length 4T or more. The output 1 is held in "H" whenever recording. In this example, the outputs 1 to 4 are late for five clocks compared with the input of record data 211 and are output. The output 2 input to the pulse width shortening section 221, and is output by shortening only shortening amount of $\Delta\tau 1$, $\Delta\tau 2$ corresponding to the pulse shortening information 114. The output 6 is obtained from an OR circuit 222 as an OR of the output 5, output 3, and output 4.

A strength of the irradiation laser light (the erasing power level and the peak power level of P1) is set in the registers 203 and 204, and is converted into current or voltage signals 216 and 217 with the D/A converter in each output stage. Laser drive signal 215 shown in FIG. 11 is obtained that this current or voltage signals 216 and 217 are selected with switches 207 and 208 which are turned on and off according to the signals of outputs 1 and 6 and the current addition or voltage addition is performed by adder 214.

With such a configuration, the pulse width when the mark is recorded is basically changed according to the mark length basically. Specifically, as shown in FIG. 12A, FIG. 12B, and FIG. 12C for example, when the short mark of 3T in length is recorded, the pulse width is shortened from the start or end of the record light pulse. As a result, the shift of the beginning position and the termination position of the formed mark can be compensated.

As explained in FIGS. 2A to 2C, when the short mark (e.g., mark length is 3T) is formed by the record light pulse shown in FIG. 1A and FIG. 1B, both of the beginning position and the termination position of the mark intends to shift in the direction where the mark length extends from the beginning position the termination position of the formed long mark (e.g., mark length is 5T) which is recorded by performing the irradiation starting light or the irradiation end with the same timing. Therefore, a method of shortening the pulse width from the start and end of the irradiation light pulse for the compensation of the shift of the beginning position and the termination position of the mark according to the length of the mark length when a short mark is recorded like the embodiment is valid. Of course, a compensation effect only for shortening the pulse width from either the start or end side can be expected.

An effect by shortening the pulse width especially shortened from a start side of the pulse when the record density is high, that is, a compensation effect by $\Delta\tau1 \cdot T$ of FIG. 12A to FIG. 12F is large according to the research of inventors. It can be confirmed that there are some effects of the decrease for the shift of the termination position as the result of the lowering of the temperature at an end of the irradiation by shortening the pulse width, though a shift of the beginning position can mainly compensate only for $\Delta\tau1 \cdot T$ ($\Delta\tau2=0$).

In the embodiment, even if the optical disks 100 are the same media, the pulse widths of the irradiation light pulses differ from each other according to the record density (line record density) in the mark length direction as shown FIG. 12A to FIG. 12F. That is, a beginning and a termination are shortened only at $\Delta\tau1 \cdot T$ and $\Delta\tau2 \cdot T$ respectively from the pulse width of a leading pulse compared with the long mark of length 4T or more is recorded only at time when the short mark of 3T in length is recorded as shown in FIG. 12A, FIG. 12B, and FIG. 12C as mentioned above, when the line record density is low.

On the other hand, at high line record density, by shortening a beginning and termination portions from the pulse width of a leading pulse are shortened at only $\Delta\tau3 \cdot T$ ($\Delta\tau1 \neq \Delta\tau1$) and $\Delta\tau4 \cdot T$ ($\tau4 \neq \Delta\tau2$), respectively only when the short mark of 3T in length is recorded as shown in FIG. 12D, FIG. 12E, and FIG. 12F, the beginning position and the termination position of a more highly accurate mark can be formed. In general, when a compensation of above described power is not performed, it is desirable to compensate to enlarge the shortening amount ($\Delta\tau-T$) with increasing the line record density.

Another effect of the embodiment will be explained more in detail.

A record compensation method in which the position of the beginning and the termination of the mark formed without increasing a cost by changing the pulse width according to the length of the mark to avoid the shift of the beginning position and the termination position of the mark depending on the length of the mark, is achieved in high accuracy is considered. In this method, the mark position can be formed in high accuracy by specifying the amount of the change of pulse width (compensation) from a thermal characteristic of the medium by the experiment and the simulation, etc., beforehand and reflecting it in the recording device.

In addition, when the record compensation is performed by changing the pulse width, it is similar to the above-mentioned device (method). That is, when the record density (line record density) in the mark length direction is small, as shown in FIG. 13A, FIG. 13B, and FIG. 13C, a highly accurate mark can be formed even by the record compensation method of which the pulse width is shortened at only time $\Delta\tau1 \cdot T$ and $\Delta\tau2 \cdot T$ at start and termination of the pulse respectively, only at time when the short mark of 3T in length is recorded. If the line record density is high, the beginning position and the termination position of the mark shift when the pulse width at which the short mark of 3T in length is recorded as shown in FIG. 13D, FIG. 13E, and FIG. 13F is shortened only at time $\Delta\tau1 \cdot T$ and $\Delta\tau2 \cdot T$ as well as the above-mentioned.

By setting the pulse width shortening ratio $\Delta\tau1=0.2$, $\Delta\tau2=0.1$ only at time when the short mark of 3T in length is recorded when information is in a high density recorded for example with the optical disk drive which can reproduce a high density record, even if the most highly accurate mark can be formed, when an information is recorded in a low density in the same medium with the conventional record reproducing device (low density record reproducing device), it can happen to form a highly accurate mark if pulse width shortening ratio are set at $\Delta\tau1=0.1$, $\Delta\tau2=0.2$ when length 4T or more mark is recorded only at time when the mark of 3T in length is recorded.

According to this embodiment, the point mentioned above is solved by changing a pulse width of the irradiation light to form the mark as mentioned above according to the length of the mark, and changing an pulse width of the irradiation light according to the record density in the mark length direction.

When both a high density record and the low density record are achieved by the high density record reproducing device, a highly accurate mark can be formed by changing the amount of shortening of the pulse width as the above-mentioned according to the line record density. Therefore, according to the present invention, the interchangeability of the medium to the record density that it is the different between generations and to a high density record from the low density record can be given.

Though the embodiment of the present invention is explained above, the present invention additionally is variously transformed and can be executed as follows.

In the above-mentioned embodiment, for example, though an example of the method for compensation by controlling irradiation light strength according to the line record density and a method of controlling the pulse width according to the line record density is explained as a method of the compensation for the shift of the beginning position and the termination position of the mark according to the line record density, a compensation method by which both of them are combined is possible. Both of them can be combined according to the line record density, such that, for example, the peak power level is set to 95% in the low line record density and the pulse width is fixed, and the peak power level is set to 90% in the high line record density, the pulse width is shortened only at T/8.

Moreover, the present invention is not limited to the modulation method of 8/16 modulation in the above-mentioned example. For example, the shortest mark becomes 2T in the (1, 7) modulation.

Though the record pulse (irradiation light pulse) was assumed to be a multi-pulse of a fixed pattern in the above-mentioned embodiment, the record compensation method according to the present invention can also be applied to a case that an "off pulse" in which power is lowered below the erasing power level once at an end of the record pulse, a case that the power between multi-pulses below the erasing power level, or rectangular pulse and a multi-pulse of other patterns etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording device which forms a mark, wherein said mark indicating record information is formed by irradiating a record light pulse on a record medium, by controlling at least one of a strength and a pulse width of record light pulse according to both of a mark length of said mark and a line record density, which is a record density in a mark length direction of said record medium,
    to create at least a first record medium having a first line record density and a second record medium having a second line record density whose line record density differs from the first line record density.

2. An optical information recording method comprising:
    forming a mark indicating record information by irradiating a record light pulse on a record medium, wherein
    said mark forming step includes a step of forming a desired mark by controlling at least one of a strength of said record light pulse and a pulse width of said record light pulse according to both of a mark length of said mark and a line record density, which is a record density in a mark length direction of said record medium, and
    repeating said forming to create at least a first optical medium having a first line record density and a second optical medium having a second line record density whose line record density differs from the first line record density can be manufactured.

3. An optical information recording device which forms a mark, wherein said mark indicating record information is formed by irradiating a record light pulse on a record medium by controlling at least one of a strength and a pulse width of said record light pulse according to both a mark length of said mark and a line record density, which is a record density in a mark length direction of said record medium, wherein
    a pulse width is set to a different pulse width from a pulse width proportional to linear density.

4. The device of claim 3, wherein the pulse width changes at a rate higher than that of the linear density.

5. An optical information recording device which forms a mark, wherein said mark indicating record information is formed by irradiating a record light pulse on a record medium by controlling at least one of a strength and a pulse width of said record light pulse according to both a mark length of said mark and a line record density, which is a record density in a mark length direction of said record medium, wherein
    a record compensation is set to a different record compensation from a record compensation proportional to the linear density.

6. The device according to claim 5, wherein the record compensation changes at a rate larger than that of the linear density.

7. An optical information recording device which forms a mark, wherein said mark indicating record information is formed by irradiating a record light pulse on a record medium by controlling at least one of a strength and a pulse width of said record light pulse according to both a mark length of said mark and a line record density, which is a record density in a mark length direction of said record medium, wherein
    a record power is set to a different record power from a record power proportional to the linear density.

8. The device according to claim 7, wherein the record power changes at a rate larger than that of the linear density.

* * * * *